Feb. 20, 1968

R. P. H. WINDER 3,370,225

ELECTROMETER DEVICE FOR MEASURING
THE STRENGTH OF ELECTRIC FIELDS

Filed Oct. 28, 1964

United States Patent Office 3,370,225
Patented Feb. 20, 1968

3,370,225
ELECTROMETER DEVICE FOR MEASURING THE STRENGTH OF ELECTRIC FIELDS
Ronald P. H. Winder, Lexington, Mass., assignor to International Paper Company, New York, N.Y., a corporation of New York
Filed Oct. 28, 1964, Ser. No. 407,122
6 Claims. (Cl. 324—32)

ABSTRACT OF THE DISCLOSURE

An electrometer device for measuring electric field strength in which an electrometer tube and a probe are mounted in a shielded housing. A shutter mechanism is periodically operated to expose the probe to external electric fields and thereby change the transconductance of the tube. When the shutter is closed the probe is grounded.

---

The present invention relates to electrical measurements and more particularly to the measurement of electric fields.

For many purposes it has been found desirable to be able to measure electric fields and for these purposes a variety of electrometers have been developed. Such instruments have presented a number of problems, e.g., drift, especially when used to measure relatively small fields in confined spaces subject to varying ambient fields.

The principal object of the invention has been the provision of a novel and improved electrometer instrument.

Another object of the invention has been the provision of such an instrument which is especially suited to the measurement of small electric fields in confined spaces.

Still another object of the invention has been the provision of such an instrument which can be operated over a relatively long period of time without significant drift.

Other and further objects, features and advantages of the invention will appear more fully from the following description of the invention taken in connection with the appended drawings in which.

Figure 5:
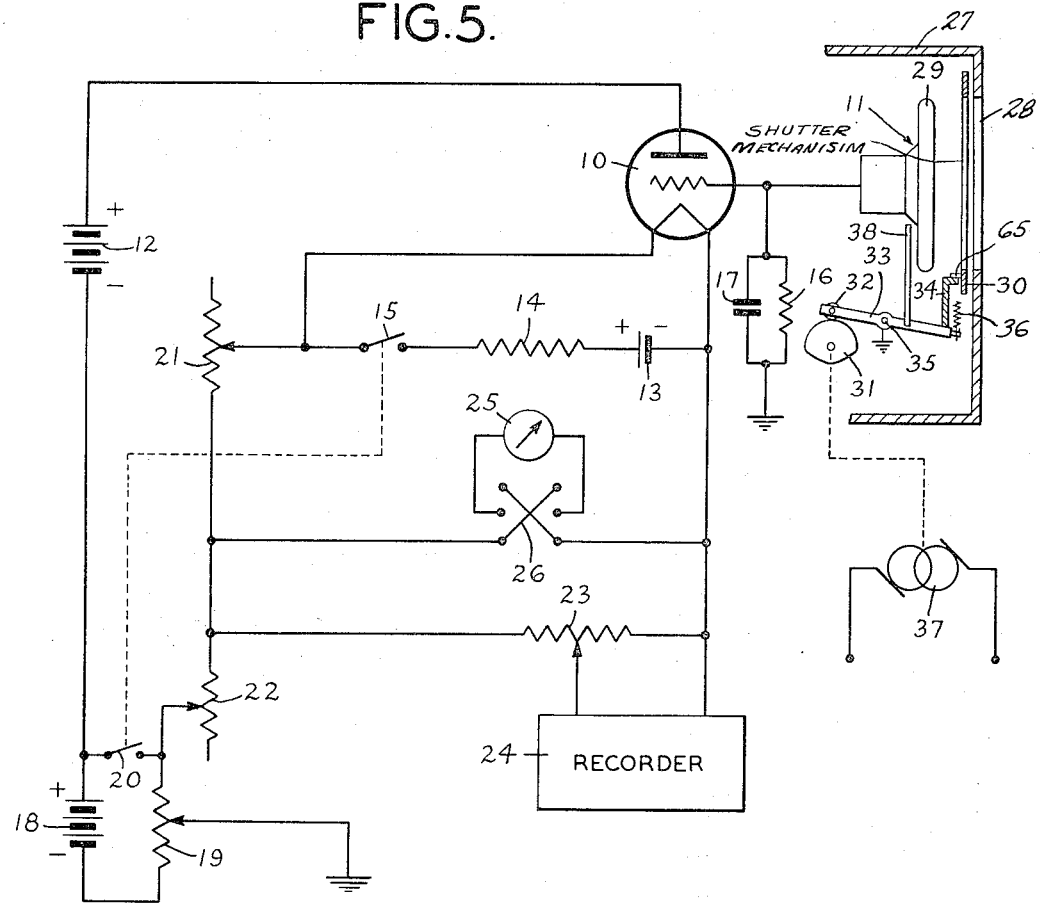
FIG. 5 is a schematic diagram showing the circuit for the instrument of FIGS. 1–4.

Referring now to the drawings and more particularly to FIG. 5, an electrometer tube is shown at 10. The tube 10 is of the triode type and has a grid connected to a conductive probe member 11, an anode connected to the positive terminal of a source of operating voltage 12 and a cathode having two terminals supplied with heater voltage from a source 13 connected in series with a resistor 14 and a switch 15. The British electrometer tube type XE2 has been found especially well suited to the purposes of the invention, although other tubes may be used. The term "electrometer tube" as used in the specification and claims herein is intended to include the various devices which may be used for this purpose.

A grid leak resistor 16 and shunt capacitor 17 are connected in parallel between the grid of tube 10 and ground. Typically, the resistor 16 might have a value of $1 \times 10^{12}$ ohms and the capacitor 17 might have a value of $60 \times 10^{-12}$ farads, yielding a time constant of 60 seconds. A second source of operating potential 18 is connected in series with source 12 and is arranged to be shunted by a potentiometer 19 when a switch 20 is closed. The switch 20 is ganged with switch 15. The slider of potentiometer 19 is connected to ground. Adjustment of potentiometer 19 provides a zero adjustment.

One of the cathode terminals of tube 10 is coupled to ground and to the low side of source 12 through series connected potentiometers 21 and 22. A potentiometer 23 is connected between the other terminal of the cathode of tube 10 and the junction of potentiometers 21 and 22. A recorder 24, which may be of any desired type, is connected between the slider and one end of potentiometer 23. Adjustment of potentiometer 23 effects adjustment of recorder sensitivity. In many cases it will be desirable to use a DC amplifier (not shown) to drive the recorder. A microammeter 25 is connected in parallel with potentometer 23 through a reversing switch 26 to permit direct reading of field strengths.

The circuit so far described is essentially of conventional design and is basically a simple battery type electrometer of the kind used in atmosphere studies and for other purposes. With this circuit, recorder 24 and meter 25 receive DC voltages proportioned to the strength of the electric field acting on probe 11.

In accordance with the invention, the electrometer tube and associated elements are enclosed within a metallic shielding housing 27 (FIG. 1) which acts to shield the electrometer from stray or ambient fields. The housing has a circular field admitting aperture 28 which communicates with front face 29 of probe 11. Except for exposure of front face 29, the interior of housing 27 is shielded against all external fields.

A shutter mechanism 30 is provided to permit closing of aperture 28. When shutter mechanism 30 is closed the aperture 28 is effectively closed and external fields cannot reach probe 11. When shutter mechanism 30 is open, external fields can enter aperture 28 and act on front face 29 of probe 11. The shutter mechanism 30 may be of any suitable type. A diaphragm type shutter of the kind frequently used in photographic cameras is illustrated in FIGS. 1–4 and is well suited to the requirements of the invention. However other types of shutter mechanisms can be used.

As is shown schematically in FIG. 5, shutter mechanism 30 is controlled by a cam 31 acting through a cam follower 32 provided at one end of a pivoted arm 33. The other end of arm 33 is connected to shutter mechanism 30 through a linkage designated 34. The arm 33 is urged to pivot in a counterclockwise direction about pivot pin 35 by a spring 36 so that cam follower 32 is maintained in contact with cam 31. Cam 31 is rotated at a desired rate, e.g., 15 r.p.m., by a motor 37.

When follower 32 rides on the upper semi-circular portion of cam 31, the shutter mechanism 30 is open and face 29 of probe 11 is exposed to electric fields entering aperture 28. When follower 32 rides on the lower portion of cam 31, the shutter mechanism 30 is closed and probe 11 is shielded by the metallic shutter blades from external fields. The cycle of operation may be adjusted as desired by providing an appropriate shape for cam 31, and the total cycle time may be adjusted by appropriate adjustment of the speed of motor 37. Typically, the cam may be driven and shaped to provide a total cycle time of 4 seconds with the shutter being open for 2.3 seconds of the 4 seconds. A relatively slow pulse rate (long duration cycle) is desirable for most purposes to permit the grid of the electrometer tube 10 to go to zero volts (ground) while the shutter is closed.

The arm 33 is provided with a grounding shoe 38 which is arranged to contact probe 11 when the shutter is closed. The shoe 38, when in contact with probe 11, connects the latter to ground through arm 33, pivot pin 35 and pivot support 40. When the shutter is open, as shown in FIG. 5, arm 38 does not contact probe 11 and hence allows the latter to assume a voltage determined by the electric field entering aperture 28.

It will be appreciated that closing of the shutter mechanism 30 and grounding of the probe 11 collapses the electric field around probe 11 and grounds out the electrometer tube grid circuit. The electrometer tube grid is thus relieved of any accumulated or leakage charge before the probe is allowed to sense a new and possibly different electric field by opening of shutter mechanism 30.

The instrument described is especially well suited to the measurement of small electric fields. For example, it has been used with good results in detecting small changes in the electrics of electrically charged papers such as are used in electrical office copying machines.

Figure 6:
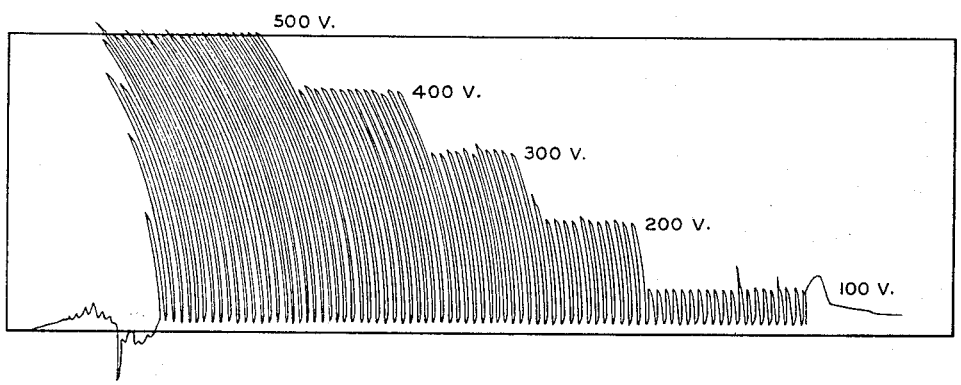
FIG. 6 is a typical electric field plot taken with the instrument of FIGS. 1–4.

For calibration of the instrument a metal plate (not shown) may be located adjacent the aperture 28 in the same position as the source of electric field intended to be measured. The metal plate is then subjected successively to a number of values of D.C. voltage to develop a calibration plot. Such a plot is shown in FIG. 6 for a number of voltage values. As shown in FIG. 6, the output voltage to the recorder goes to zero during each cycle of shutter operation. And this is a true zero value by reason of the collapse of the electric field and the grounding of the probe which allows the grid circuit to be grounded, and relieves the electrometer of stray or accumulated charges. Hence, each time the shutter 30 opens the electrometer output voltage is dependent only on the electric field sensed by the probe, and is independent of the prior charge history. Thus a small change in detected charge can be sensed readily and accurately.

Referring now particularly to FIGS. 1–4, the housing 27 is shown as a hollow metal cylinder 41 closed at the back by a metal disk 42 and at the front by a metal disk 43. The disk 43 is provided with a central circular opening forming the aperture 28. A circular metallic wall 44 is provided spaced inwardly from front wall 43. An annular metallic member 45 projects forwardly of wall 44 and is provided with an annular flange 46 which is spaced closely to the inner surface of front wall 43. The central space of member 45 constitutes an extension of aperture 28.

Figure 3:
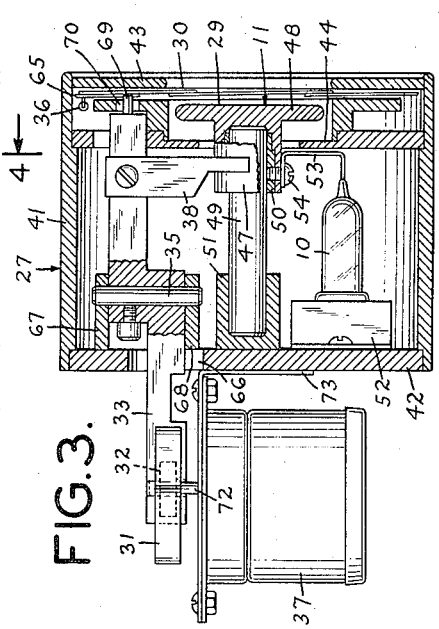
FIG. 3 is a vertical cross sectional view taken along the line 3—3 of FIG. 1.

Probe 11 is mounted within the space bounded by wall 44 and the member 45. Probe 11 has a hollow hub portion 47 and a circular projecting flange 48 the front face 29 of which faces aperture 28. Probe 11 is supported by a pin 49 one end of which is accommodated within a bushing 50 which in turn is accommodated within the hub portion 47 of probe 11, as is best shown in FIG. 3. The other end of pin 47 is supported in a bracket 51 which projects forwardly from rear wall 42. Pin 49 is an electrical insulator so that probe 11 can assume a potential different from the housing (ground) potential.

Tube 10 is supported on a chassis 52 which is carried on rear wall 42. The grid of tube 10 is connected to probe 11 by a conductor 53 and a screw 54 acting in threaded holes in hub 47 and bushing 50. The resistor 16 and condenser 17 are mounted within housing 27 and are grounded at a screw 55 acting in a threaded hole in rear wall 42. The anode and cathode leads of tube 10 (not shown in FIGS. 1–4) are carried out through rear wall 42 to a control and battery box (not shown) housing the other circuit elements of FIG. 5.

Figure 1:
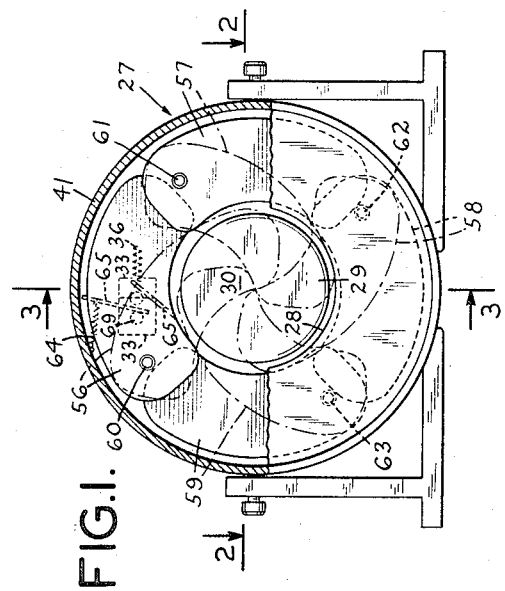
FIG. 1 is a front elevational view of an electrometer instrument embodying the invention.

The shutter mechanism 30 comprises four diaphragm blades 56, 57, 58 and 59, which are best shown in FIG. 1. The shutter blades are pivotally mounted on the inner surface of front wall 43 by means of respective pivot pins 60, 61, 62 and 63. The shutter blades are urged to their open positions (shown in dotted and full lines in FIG. 1) by a spring 64 acting on a projection 65 of blade 56. In their closed positions (shown in dot-dash lines in FIG. 1) the blades are pivoted inwardly to close aperture 28. The shutter mechanism is not shown in great detail since it is of the ordinary diaphragm type well known and widely used in photographic cameras.

Figure 2:
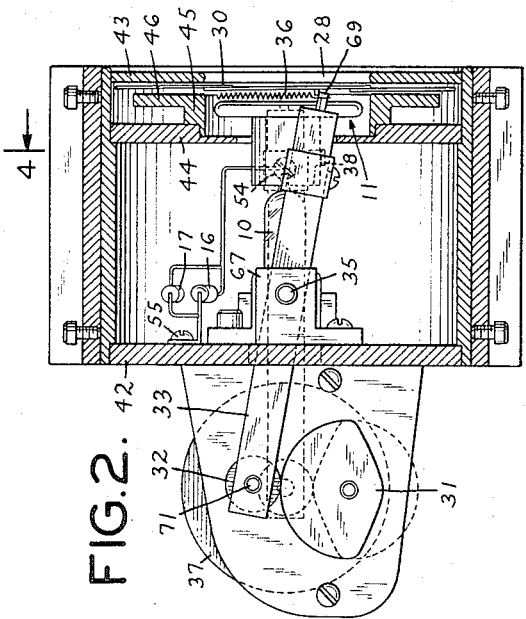
FIG. 2 is a horizontal cross sectional view taken along the line 2—2 of FIG. 1.

As is best shown in FIGS. 2 and 3, arm 33 extends through an opening 66 in rear wall 42 and is mounted on pin 35 for horizontal pivoting motion. Pin 35 is journaled at opposite ends thereof in aligned holes in brackets 67 and 68 projecting inwardly from rear wall 42.

At its front end, arm 35 carries a projecting pin 69 which extends through a slot 70 in flange portion 46 of member 45 and contacts projection 65 on blade 56. Pin 69 serves as an anchor for spring 36 and also moves projection 65 in order to move blades 56–59 from their open positions to their closed positions in opposition to spring 64.

Follower 32 is mounted adjacent the end of arm 33 outside of housing 27. Follower 32 is a roller which is rotatably supported on a pin 71. Follower 32 contacts cam 31 which is carried on the end of shaft 72 of motor 37. Motor 37 is mounted on the external surface of rear wall 42 by a bracket 73.

Figure 4:
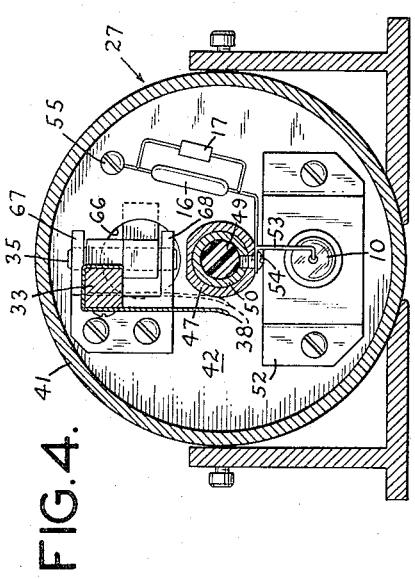
FIG. 4 is a vertical cross sectional view taken along the line 4—4 of FIG. 2.

As is best shown in FIGS. 3 and 4, grounding strap 38 is a leaf spring attached to arm 33 and arranged to clear hub 47 when the shutter is open and to contact hub 47 when the shutter is closed.

By reason of the shape of probe 11 and the adjacent metallic members (wall 44, member 45 and wall 43), the interior of housing 27 between walls 42 and 44 is effectively shielded from electric fields existing in aperture 28. Hence the grid of tube 10 will adopt a potential dependent on the electric field to which the front face of probe 11 is subjected. This will be the field entering aperture 28 when the shutter is open and ground or zero when the shutter is closed.

The instrument of the invention can be used for a variety of measurment purposes. Among these are applications where an electric field meter having infinite impedance (so far as the system being measured is concerned) is desirable.

While the invention has been described in a specific embodiment thereof and in specific uses, various modifications thereof will occur to those skilled in the art without departing from the spirit and scope of the invention as set forth in the appended claims.

What is claimed is:

1. An electrometer device, comprising an electrically conductive housing defining an enclosed space shielded from external electric fields, an electrometer tube mounted in said housing, a probe element mounted in said housing and coupled to said tube to alter the transconductance of the latter in proportion to the strength of any electric field to which said probe is subjected, said housing having an aperture for admitting external electric fields to said probe, a shutter mechanism mounted in said housing and arranged when open to permit electric fields to enter said aperture and contact said probe, said shutter mechanism being arranged when closed effectively to close said aperture to external electric fields, grounding means in said housing arranged selectively to be out of electrical contact with said probe and to be in electrical contact with said probe, operating means in said housing for opening and closing said shutter mechanism, said operating means being arranged to place said grounding means out of electrical contact with said probe when said shutter mechanism is opened and to place said grounding means in electrical contact with said probe when said shutter mechanism is closed, and power means arranged to act on said operating means to cause the latter periodically to open and then close said shutter mechanism in accordance with a predetermined cycle.

2. An electrometer device, comprising an electrically conductive housing defining an enclosed space shielded from external electric fields, an electrometer tube mounted in said housing, a probe element mounted in said housing and coupled to said tube to alter the transconductance of the latter in proportion to the strength of any electric field to which said probe is subjected, said housing having an aperture for admitting external electric fields to said probe, a shutter mechanism mounted in said housing and arranged when open to permit electric fields to enter said aperture and contact said probe, said shutter mechanism being arranged when closed effectively to close said aperture to external electric fields, movable grounding means in said housing arranged in one position to be out of electrical contact with said probe and in another position to be in electrical contact with said probe, operating means in said housing for opening and closing said shutter mechanism, said operating means being arranged to move said grounding means out of electrical contact with said probe when said shutter mechanism is opened and to move said grounding means into electrical contact with said probe when said shutter mechanism is closed, and power means arranged to act on said operating means to cause the latter periodically to open and then close said shutter mechanism in accordance with a predetermined cycle.

3. An electrometer device as set forth in claim 2 in which said power means comprises a motor, a cam driven by said motor and a cam follower mechanism intercoupling said cam and said shutter mechanism and grounding means for selectively opening and closing said shutter mechanism and selectively moving said grounding means between said one and said other positions thereof.

4. An electrometer device, comprising:
 (a) a conductive housing having a hollow body, a front wall, a rear wall and an intermediate wall located adjacent but spaced from said front wall, said front wall having an opening forming an aperture through which external electric fields may enter;
 (b) an electrometer tube mounted within said housing between said rear and intermediate walls so as to be shielded from external fields entering said aperture;
 (c) means located outside of said housing and coupled to said tube to supply operating potentials to the latter and to detect and record changes in the transconductance of said tube;
 (d) a probe element located between said front and intermediate walls and having a detecting face aligned with said aperture;
 (e) electrically insulating means to support said probe element in said housing;
 (f) means to couple electrically said probe element and an electrode of said tube so that electric fields contacting said probe element will produce a corresponding change in the transconductance of said tube;
 (g) a shutter mechanism mounted in said housing and having an open position in which said probe element is exposed to electric fields entering said aperture and a closed position in which said aperture is effectively closed and said probe element is effectively shielded from external electric fields; and
 (h) an operating mechanism for said shutter mechanism comprising a pivoted arm extending through said rear wall of said housing and being operatively coupled to said shutter mechanism adjacent one end thereof, a rotatable cam mounted outside of said housing and being in operative contact with said arm adjacent the other end thereof for pivoting said arm between a first position in which said arm opens said shutter mechanism and a second position in which said arm closes said shutter mechanism, and motor means for rotating said cam at a selected rate at which said shutter is opened and then closed in accordance with a predetermined cycle.

5. An electrometer device, comprising:
 (a) a conductive housing having a hollow body, a front wall, a rear wall and an intermediate wall located adjacent but spaced from said front wall, said front wall having an opening forming an aperture through which external electric fields may enter;
 (b) an electrometer tube mounted within said housing between said rear and intermediate walls so as to be shielded from external fields entering said aperture;
 (c) means located outside of said housing and coupled to said tube to supply operating potentials to the latter and to detect and record changes in the transconductance of said tube;
 (d) a probe element located between said front and intermediate walls and having a detecting face aligned with said aperture;
 (e) electrically insulating means to support said probe element in said housing;
 (f) means to couple electrically said probe element and an electrode of said tube so that electric fields contacting said probe element will produce a corresponding change in the transconductance of said tube;
 (g) a shutter mechanism mounted in said housing and having an open position in which said probe element is exposed to electric fields entering said aperture and a closed position in which said aperture is effectively closed and said probe element is effectively shielded from external electric fields;
 (h) a movable grounding strap arranged in one position thereof to be out of electrical contact with said probe element and in another position thereof to be in electrical contact with said probe element; and
 (i) an operating mechanism for said shutter mechanism and said grounding strap comprising a pivoted arm extending through said rear wall of said housing and being operatively coupled to said shutter mechanism and said grounding strap adjacent one end thereof, a rotatable cam mounted outside of said housing and being in operative contact with said arm adjacent the other end thereof for pivoting said arm between a first position in which said arm opens said shutter mechanism and moves said grounding strap out of contact with said probe element and a second position in which said arm closes said shutter mechanism and moves said grounding strap into contact with said probe element, said arm being in electrical contact with said housing and with said grounding strap, and motor means for rotating said cam at a selected rate at which said shutter is opened and then closed in accordance with a predetermined cycle.

6. An electrometer device, comprising:
 (a) a conductive housing having a hollow body, a front wall, a rear wall and an intermediate wall located adjacent but spaced from said front wall, said front wall having an opening forming an aperture through which external electric fields may enter;
 (b) an electrometer tube mounted within said housing between said rear and intermediate walls so as to be shielded from external fields, said tube having anode, grid and cathode electrodes;
 (c) means located outside of said housing and coupled to said anode and cathode electrodes to supply operating potentials to said tube and to detect and record changes in the transconductance of said tube caused by changes in the voltage effective at said grid electrode;
 (d) a probe element extending through said intermediate wall and having a detecting face aligned with said aperature;
 (e) electrically insulating means to support said probe element in said housing;
 (f) means to couple electrically said probe element and said grid electrode so that electric fields contacting said probe element will produce a corresponding voltage at said grid electrode;
 (g) a shutter mechanism mounted in said housing and having an open position in which said probe element is exposed to electric fields entering said aperture and a closed position in which said aperture is effectively closed and said probe element is effectively shielded from external electric fields;

(h) a movable grounding strap arranged in one position thereof to be out of electrical contact with said probe element and in another position thereof to be in electrical contact with said probe element; and (i) an operating mechanism for said shutter mechanism and said grounding strap comprising a pivoted arm extending through said rear wall of said housing and being operatively coupled to said shutter mechanism and said grounding strap adjacent one end thereof, a rotatable cam mounted outside of said housing and being in operative contact with said arm adjacent the other end thereof for pivoting said arm between a first position in which said arm opens said shutter mechanism and moves said grounding strap out of contact with said probe element and a second position in which said arm closes said shutter mechanism and moves said grounding strap into contact with said probe element, said arm being in electrical contact with said housing and with said grounding strap, and motor means for rotating said cam at a selected rate at which said shutter is opened and then closed in accordance with a predetermined cycle having a relatively low repetition rate, said repetition rate and the portion of each cycle during which said shutter is closed being selected so that the electric field about said probe is substantially completely collapsed and said grid electrode achieves substantially zero potential while said shutter is closed.

References Cited

UNITED STATES PATENTS 2,980,855  4/1961  Moore _____ 324—32

RUDOLPH V. ROLINEC, *Primary Examiner.*

C. F. ROBERTS, *Assistant Examiner.*